United States Patent [19]
Szudarek et al.

[11] Patent Number: 6,097,283
[45] Date of Patent: Aug. 1, 2000

[54] REAR LAMP MODULE WITH TRAILER TOW CONNECTOR

[75] Inventors: Robert Szudarek, Warren; Dhirendra C. Roy, Plymouth, both of Mich.

[73] Assignee: Lear Automotive Dearborn, Inc., Southfield, Mich.

[21] Appl. No.: 09/053,409

[22] Filed: Apr. 1, 1998

[51] Int. Cl.$^7$ .............................. G08B 21/00; B60Q 1/26
[52] U.S. Cl. .................. 340/431; 307/10.8; 340/464; 340/465; 340/475; 340/479; 362/485; 362/544
[58] Field of Search ..................... 340/431, 464, 340/465, 475, 479; 362/485, 544; 307/10.8

[56] References Cited

U.S. PATENT DOCUMENTS

| | | | |
|---|---|---|---|
| 3,400,293 | 9/1968 | Reichardt | 307/10.8 |
| 4,005,313 | 1/1977 | Tabbits | 340/431 |
| 4,845,465 | 7/1989 | Kruse et al. | 307/10.8 |
| 5,936,407 | 8/1999 | Borland | 324/504 |

*Primary Examiner*—Glen Swann
*Attorney, Agent, or Firm*—MacMillan, Sobanski & Todd, LLC

[57] ABSTRACT

An inventive rear lamp module for a vehicle incorporates a trailer tow connector to provide electrical signals to a trailer that is to be pulled by the vehicle. Preferably, two separate connectors are formed on a rear face of an electric lamp module. A first connector receives input signals from the vehicle and a second connector is an optional connector to be connected to a trailer connector when the trailer is connected to a vehicle. The present invention eliminates the need of a separate wire harness for the trailer connector, and thus reduces cost. In addition, by positioning the trailer tow connector within a plastic part mounted in a secure position in the vehicle, the trailer tow connector is easily maintained.

10 Claims, 3 Drawing Sheets

REAR LAMP MODULE WITH TRAILER TOW CONNECTOR

BACKGROUND OF THE INVENTION

This invention relates to a vehicle rear lamp module that incorporates an optional trailer tow connection.

Many vehicles are designed to pull or tow trailers. For safety purposes, the trailers require a pair of rear tail lights connected to the vehicle through a trailer wire harness. Accordingly, trailer-towing vehicles require a trailer tow electrical connector for providing optional connection of light control signals from the vehicle to the trailer wire harness. Rear taillight control signals may include a parking light signal, a brake signal, a right turn signal, a left turn signal, and a reverse light signal.

Most often, the trailer tow connector is provided by a loose wire harness routed to a location near a trailer tow hitch. While this location provides for a quick connection of the connector to the trailer wire harness during trailer attachment, it has several disadvantages. The trailer tow connector, being associated with a loose wire harness, is susceptible to corrosion, dirt infiltration, and damage. Furthermore, the connector adds to cost and labor of the additional wire harness.

Accordingly, there is a need for a rear lamp system which is more reliable, less expensive, and easier to assemble.

SUMMARY OF THE INVENTION

In a disclosed embodiment of this invention, a trailer tow connector for a vehicle is incorporated into a rear lamp assembly. In a most preferred embodiment, a single control board communicates with one of the rear lamps, including taillight, brake and turn signal functions. The same board provides optional electrical connection to the trailer tow connector.

In one embodiment, the signals sent into the lamp assemblies are multiplexed, such that the trailer tow connector will receive all of the signals through multiplexed signals, and such that it will then be able to easily determine turn signals, stop signals, etc.

The present invention eliminates the need for a separate wire harness for the trailer tow connection, and further provides a secure location for the trailer tow connector such that the connector is better connected and more easily maintained.

In a preferred method of forming the circuit board for this invention, a dual molding process is utilized. Dual molding processes are known, wherein a pair of distinct plastic materials are injected into a mold to form two distinct areas in a molded plastic item. In the present invention, the portions of the board which are to conduct electricity are formed by a first plastic which receives and holds conductive material at a later step. The remainder of the circuit board is formed of a plastic which will not hold the conductive material. Once the two part plastic part is molded, conductive material is deposited onto the plastic. The conductive material adheres to the first plastic but not to the second plastic. Thus, the final item will have conductive material at all locations formed from the first plastic, but the conductive areas will be separated by areas of the second plastic such that appropriate circuits are formed. Clips to hold lights are molded as part of the structure formed by the first plastic such that they are conductive, but yet have the resilience of their underlying plastic material. Such molding techniques are known; however, this is the most preferred method of forming the inventive circuit board.

These and other features of the present invention can be best understood from the following specification and drawings, the following of which is a brief description.

DETAILED DESCRIPTION OF A PREFERRED EMBODIMENT

Figure 1:
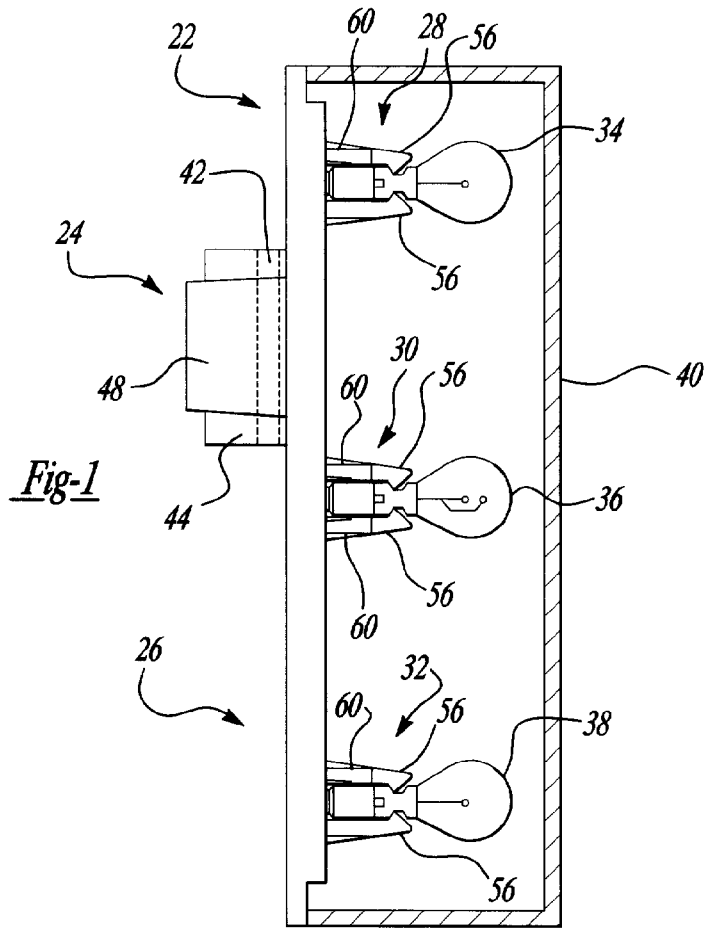
FIG. 1 is a side view of a rear lamp module in accordance with the present invention.

As shown in FIG. 1, a rear lamp module 22 includes an electrical connector member 24, a support 26, a plurality of bulb sockets 28, 30, and 32 attached to support 26, a plurality of bulbs 34, 36, and 38 secured within bulb sockets 28, 30, and 32, and a lens cover 40. Lens cover 40 is attached to one side of support 26 so as to cover bulbs 34, 36, and 38. Electrical connector member 24 is attached to the opposite side of support 26. The rear lamp module 22 may further include a multiplex signal decoder 42 connected between connector member 24 and support 26 as shown in phantom. The decoder 42 is not required if the input signals are not multiplexed as described below.

Figure 2:
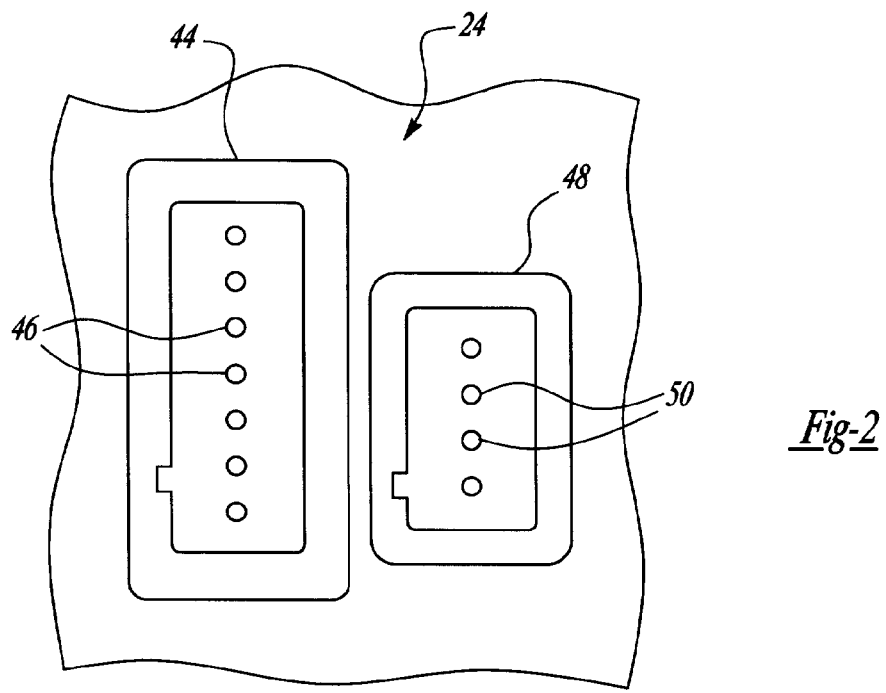
FIG. 2 shows a fragmented rear view of the rear lamp module showing a receiving end of an electrical connector member of the rear lamp module.

As shown in FIG. 2, connector member 24 includes an electrical input connection 44 having a plurality of input terminals 46 and an electrical output connection 48 having a plurality of output terminals 50. The plurality of input terminals 46 receive electrical power from a power distribution system (not shown) to illuminate bulbs 34, 36, and 38 and the plurality of output terminals 50 supply electrical power to illuminate bulbs in a second vehicle taillight or to send signals to a trailer tow connector. One skilled in the art will appreciate that the number of input terminals 46 required is based upon the number of separate signals transmitted to the input connection 44 and that the number of output terminals 50 required is based upon the number of separate signals required by the trailer.

Figure 3:
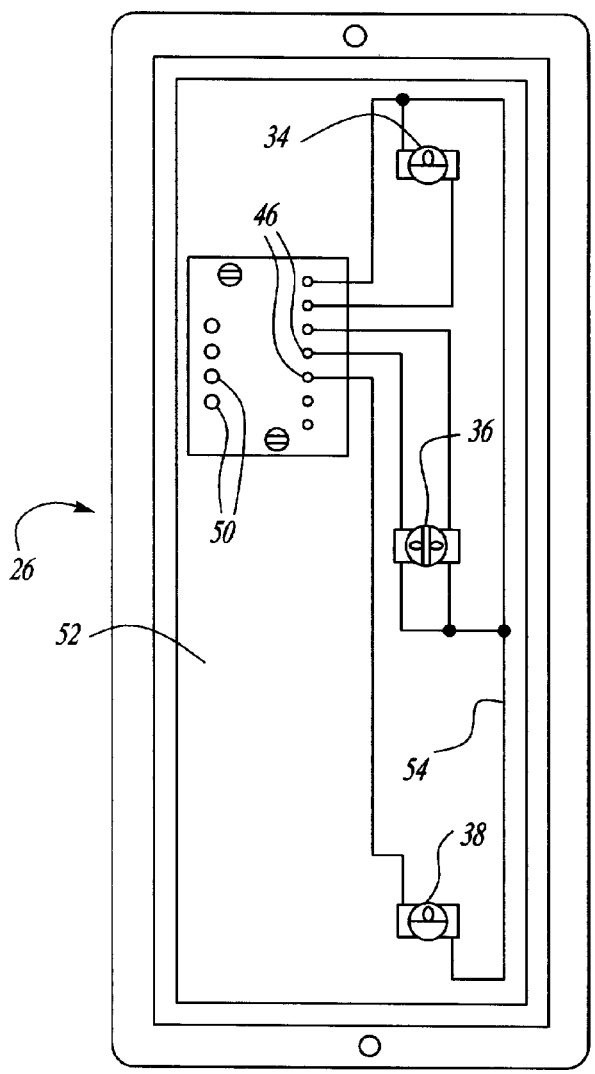
FIG. 3 shows a front view of the rear lamp module with the lens cover removed.

As shown in FIG. 1, bulb sockets 28 and 32 are designed to operate single filament bulbs 34 and 38 respectively. Bulb socket 30 is designed to operate a double filament bulb 36. Bulb socket 28, 30, and 32 include two spring-loaded retaining arms 56 formed integrally with circuit board 52 (FIG. 3). Retaining arms 56 are designed to secured a bulb within its respective socket. Arms 56 are molded of the non-conductive holding plastic as described above.

As shown schematically in FIG. 3, support 26 includes a circuit board 52 of electrically non-conductive material supporting an electrically conductive circuit 54. Circuit 54 transmits electrical power from input terminals 46 to the proper bulb sockets 34, 36, and 38 and output terminals 50. As can be appreciated from FIGS. 1 and 3, the circuitry communicating with connectors 44 and 48 is formed in a single circuit board.

Figure 4:
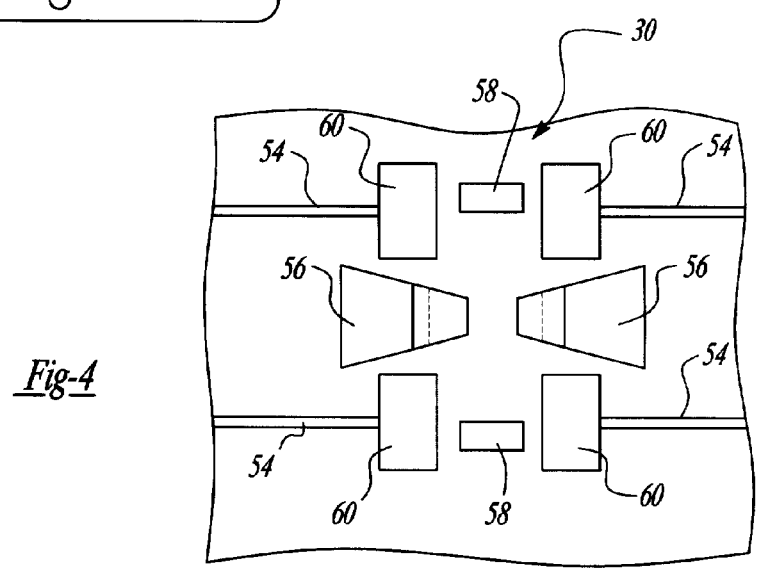
FIG. 4 shows a fragmentary front view of the rear lamp module with the lens cover removed showing an empty bulb socket.

FIG. 4 shows a front view of bulb socket 30 with bulb 36 removed. Bulb socket 30 includes two spring-loaded retaining arms 56, two stoppers 58 upon which the base of a bulb is designed to rest, and four electrodes 60. Each electrode 60 extends from circuit 54. Bulb sockets 28 and 32 are identical to bulb socket 30 but only include two diagonally opposed electrodes 60.

Figure 5:
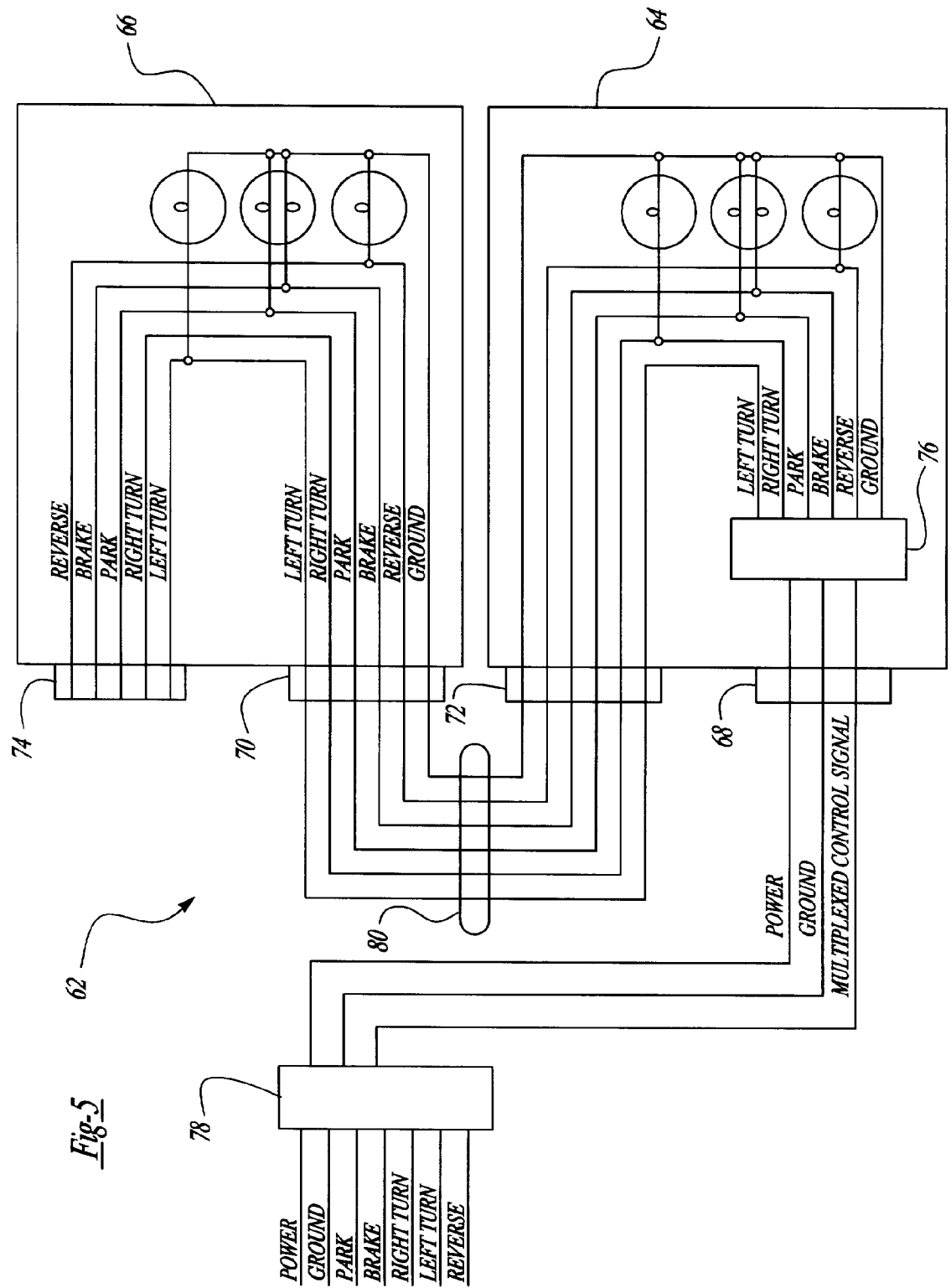
FIG. 5 shows an electrical schematic of a rear lamp system providing a trailer tow connector, and two vehicle rear lamp modules in accordance with the present invention.

FIG. 5 is an electrical schematic of a rear lamp system 62 providing a trailer tow connector 74. Rear lamp system 62 incorporates two substantially identical rear lamp modules 64 and 66 in accordance with the present invention. First and second rear lamp modules 64 and 66 include input connections 68 and 70 and output connections 72 and 74 respectively. In a preferred embodiment, rear lamp system 62 receives a multiplexed control signal. As a result, first rear lamp module 64 further includes a multiplex signal decoder 76.

Multiplex signal generator 78 receives a plurality of signals including a park light signal, a brake signal, right turn signal, a left turn signal, and a reverse light signal and generates a multiplexed control signal therefrom. Power, ground, and the multiplexed control signal are transmitted to the input connection 68 of first rear lamp module 64. Multiplex signal decoder 76 decodes the multiplexed control signal into a plurality of separate signals including a park light signal, a brake signal, right turn signal, a left turn signal, and a reverse light signal. Accordingly, each signal is transmitted to the proper bulb for illumination. For example, if the first rear lamp module 64 is designed to operate as a right taillight as shown then the park light signal, the brake signal, the right turn signal, and a reverse light signal will illuminate the proper bulb when appropriate. Further, every signal (park light, brake, right turn, left turn, and reverse light) is separately transmitted to the output connection 72 of the first rear lamp module 64.

Jumper harness 80 separately transmits each signal from the output connection 72 of the first rear lamp module 64 to the input connection 70 of the second rear lamp module 66. Similar to the first rear lamp module 64, each signal is transmitted to the proper bulb for illumination thereof. For example, if the second rear lamp module 66 is designed to operate as a left taillight as shown then the park light signal, the brake signal, the left turn signal, and a reverse light signal will illuminate the proper bulb when appropriate. Further, every signal (park light, brake, right turn, left turn, and reverse light) is separately transmitted to the output connection 74 of the second rear lamp module 66. Accordingly, the output connection 74 of the second rear lamp module 66 operates as the trailer tow connector which may be selectively connected to a trailer wire harness to supply the park light signal, brake signal, right turn signal, left turn signal, and reverse light signal to a trailer. As can be appreciated from FIG. 5, module 66 electrically communicates input signals from a connector 70 to its lights and also to trailer tow connector 74. A single circuit preferably achieves these functions. Connections 72 and 74 are equivalent to connectors 48 (FIG. 2) and connectors 68 and 70 are equivalent to connectors 44 (FIG. 2).

Figure 6:
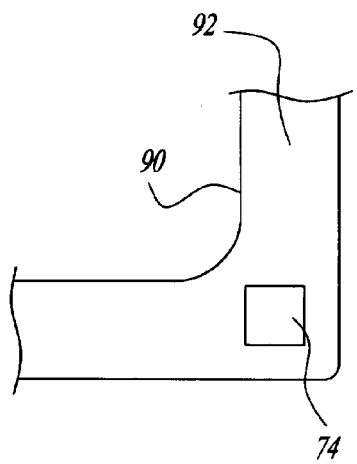
FIG. 6 schematically shows a connector location.

In the present invention, the optional connector for communicating to a trailer tow lights is positioned at a known secure spot. Namely, the trailer tow connection 74 is positioned at the rear of a vehicle lamp module. As shown in FIG. 6, the connector would be accessible to an operator at a location such as in a rear cargo door 90 of a vehicle 92. The taillights are typically positioned outwardly of the door and near the bottom. Thus, the trailer tow harness could be moved under the open cargo door and plugged into the connector. A secure connection is thus provided.

Although rear lamp system 62 receives a multiplexed control signal, one skilled in the art will appreciate that the rear lamp system 62 may also be used with non-multiplexed signals.

Although preferred embodiments of this invention have been disclosed, a worker of ordinary skill in the art would recognize that many modifications would come within the scope of this invention. For that reason the following claims should be studied to determine the true scope and content of this invention.

What is claimed is:

1. A rear lamp assembly for a vehicle, the assembly comprising:

an indicator bulb, an input connector electrically connected with said indicator bulb, said input connector receiving control signals for controlling said indicator bulb, and an output connector to be selectively connected with a trailer wire harness and receiving a signal from said input connector, said output connector electrically communicating said control signals from said assembly to a wire harness for a trailer.

2. A rear light assembly as recited in claim 1, wherein said input connector and said output connector are formed in a single circuit board.

3. The assembly of claim 1 wherein said control signals include multiplexed signals.

4. The assembly of claim 3 further including a multiplexer decoder for receiving said multiplexed signal from said input connector, decoding said multiplexed signal, and controlling said indicator bulb based upon said multiplexed signal.

5. The assembly of claim 1 further including a bulb socket for retaining said indicator bulb.

6. The assembly of claim 5 wherein said bulb socket is comprised of at least two electrodes and a pair of spring-loaded retaining arms.

7. A vehicle electrical system comprising:

a pair of rear lamp modules including taillights, brakelights and turn signals, at least one of said rear light modules being provided with a circuit board, said circuit board including a connector for receiving input signals from a source of signals to control said lights associated with said at least one light module;

said control board also including an output connector for selective connection to a trailer tow connector, said output connection communicating with said input connector to provide signals for taillight, brakelight and turn signals to a trailer connected to said vehicle.

8. A vehicle as recited in claim 7, wherein said signals are multiplexed.

9. A vehicle as recited in claim 8, wherein an mulitiplexer decoder receives said multiplexed signal from said input connector, and is operable to decode said multiplex signal and a controlling said indicator bulb based upon said multiplexed signal.

10. A rear lamp system for a vehicle controlled by a multiplexed control signal, the system comprising:

a first rear lamp assembly having a first input connector receiving the multiplexed control signal, a multiplexer decoder electrically connected with said first input connector, said multiplexer decoder receiving and decoding the multiplexed control signal, a first indicator bulb electrically connected with said multiplexer decoder, said first indicator bulb controlled by said decoded control signal, and a first output connector outputting said decoded control signal;

a jumper wire harness connected with said first output connector of said first rear lamp assembly;

a second rear lamp assembly having a second input connector connected with said jumper wire harness, said second input connector receiving said decoded control signal, a second indicator bulb electrically connected with said second input connector, said second indicator bulb controlled by said decoded control signal, and a second output connector outputting said decoded control signal; and a trailer tow wire harness having a trailer tow indicator bulb and selectively connected with said second output connector of said second rear lamp assembly, said trailer tow wire harness receiving said decoded control signal, said trailer tow indicator bulb controlled by said decoded control signal.

\* \* \* \* \*